United States Patent [19]

Schneider et al.

[11] Patent Number: 4,798,270
[45] Date of Patent: Jan. 17, 1989

[54] HYDRAULICALLY ACTUATED SLIDING-CALIPER DISC BRAKE

[75] Inventors: Wilhelm Schneider, Steinsburgweg; Roland Keller, Leimen, both of Fed. Rep. of Germany

[73] Assignee: Deutsche Perrot-Bremse GmbH, Mannheim, Fed. Rep. of Germany

[21] Appl. No.: 128,191

[22] Filed: Dec. 3, 1987

[30] Foreign Application Priority Data

Dec. 3, 1986 [DE] Fed. Rep. of Germany ....... 3641181

[51] Int. Cl.⁴ ............................................ F16D 65/847
[52] U.S. Cl. .................................. 188/264 G; 92/212; 92/220; 92/258; 192/113 A
[58] Field of Search ............. 188/264 G; 92/256, 258, 92/211, 216, 212, 220; 403/326; 192/113 A

[56] References Cited

U.S. PATENT DOCUMENTS

| | | | |
|---|---|---|---|
| 2,498,590 | 2/1950 | Streus | 403/326 X |
| 3,502,004 | 3/1970 | Schrader | 188/264 G X |
| 3,531,144 | 9/1970 | Bizilia | 403/326 |
| 4,147,241 | 4/1979 | Preniczny et al. | 188/264 G |
| 4,572,334 | 2/1986 | Villata | 188/264 G X |
| 4,666,330 | 5/1987 | O'Connell | 403/326 X |

FOREIGN PATENT DOCUMENTS 3416942 11/1984 Fed. Rep. of Germany .

Primary Examiner—George E. A. Halvosa
Attorney, Agent, or Firm—Holman & Stern

[57] ABSTRACT

An actuator for a hydraulically actuated caliper disc brake having a brake shoe comprises an actuating piston of two-part construction mounted for displacement in a cylinder and acted upon by a pressure fluid. The actuator has a cup-shaped member of cast steel, the bottom of which is acted upon by the pressure-fluid, and a cylindrical core of a mechanically resistant and heat insulating material removably coaxially and having an end face pressed against the brake shoe when actuated. A plurality of thin discs of mechanically resistant material are secured to the end face of the core adjacent to the brake shoe for reducing heat transfer from the brake shoe to the piston.

15 Claims, 2 Drawing Sheets

HYDRAULICALLY ACTUATED SLIDING-CALIPER DISC BRAKE

BACKGROUND OF THE INVENTION

1. Field Of The Invention

The invention relates to a hydraulically actuated brake, and more particularly a sliding-caliper disc brake, having a brake shoe and an actuating piston of two-part construction mounted for displacement in a cylinder and acted upon by a pressure fluid.

2. Description Of The Prior Art

In hydraulically actuated brakes, the heat generated by the friction represents a considerable problem because it flows away, inter alia, through the actuating piston bearing against the brake shoe as a result of which, heating of the hydraulic fluid occurs. The temperature of the hydraulic fluid must, however, in no circumstances rise above 120° C. because otherwise vapor bubbles form as a result of which the operational capacity of the brake is influenced considerably.

In order to reduce the flow of heat taking place through the actuating piston, it is already known to construct the actuating piston in the form of a cup-shaped portion of cast steel, the bottom of which faces the pressure-fluid side, and of a cylindrical core of a mechanically resistant and heat-insulating material which is inserted coaxially in and detachably connected to the cup-shaped portion and which can be pressed against the brake shoe. In a hydraulically actuated brake of this type described in German Patent reference DE-OS No. 34 16 942, corresponding to U.S. Pat. No. 4,572,334, the cup-shaped portion consists of cast steel and the core consists of 30 percent by weight of glass fibers, 50 percent by weight of mineral filling material and 20 percent by weight of binder, for example phenolic resin. In this known actuating piston, the core is provided with a central tapped bore and the cup-shaped portion has a corresponding threaded pin onto which the core is screwed. This two-part construction of the actuating piston is still not sufficient, however, for reliable prevention of excessive heating of the hydraulic fluid and hence the formation of vapor bubbles in the event of prolonged brake actuation as for example during a relatively long descent.

BRIEF SUMMARY OF THE INVENTION

It is therefore the object of the invention to provide a hydraulically actuated brake of the above type wherein the amount of heat from the brake shoe flowing away through the actuating piston is still further reduced.

This object is achieved according to the invention, in that a plurality of thin discs of a mechanically resistant material are secured to the end face of the core adjacent to the brake shoe whereby the conduction of heat is considerably reduced in comparison with one thicker disc because a jump in temperature occurs at the contact face of each two adjacent discs. An improved thermal insulation of the actuating piston in relation to the brake shoe is thereby achieved so that overheating of the hydraulic fluid does not occur even in the event of prolonged actuation of the brake. The discs may appropriately consist of ground and hardened steel discs. This has the advantage that the stack of discs is incompressible when the brake is actuated whereby no greater actuating travel results.

In one embodiment of the invention, which is particularly advantageous from the design point of view, the discs are held bearing against the core by a cover which is braced to the core by a central screw. In order that the head of the screw may be countersunk, the discs are annular and the cover comprises a flange engaging over the circumference of the discs. The discs are centered by the flange and at the same time the flange can be used to locate a sealing collar on the core of the two-part actuating piston.

For the reasons already mentioned, the material for the cupshaped portion and for the core of the actuating piston should have as low a heat conductivity as possible, but on the other hand, this material must be sufficiently resistant to deformation to be able to transmit the pressure exerted by the hydraulic fluid to the brake shoe. Spheroidal graphite cast iron known as GGG-60 has proved particularly suitable for the cup-shaped portion of the actuating piston while the core preferably consists of plastics material.

A screw connection between the cup-shaped portion and threaded pin, such as shown in the above German Patent reference, is not possible with the combination of materials for the cup-shaped portion and the core according to this invention, because the plastics material has a different specific heat expansion from the spheroidal graphite cast iron. For this reason, neither a press fit nor a screw connection can be made. In the execution of a press fit, the destruction of the comparatively brittle cast iron would have to be taken into consideration when the parts are fitted together and even if this fitting together were to take place without any damage, destruction would undoubtedly occur due to the absorption of heat during a braking operation because of the different heat expansion characteristics. These problems would arise not only with a press fit but also with a screw connection. Apart from this, fine machining either for a press fit, or for a screw connection, leads to considerable expense.

It is therefore provided in a further development of the invention that the cup-shaped portion comprises, in the interior, a circular recess diverging towards its bottom and that the core is provided with a circumferential groove in which there is inserted a circlip supported against the inclined face of the recess. The radial force exerted by the circlip on the inclined face of the recess in the cup-shaped portion consequently has an axial component under the influence of which, the core is pressed against the bottom of the cup-shaped portion. Therefore, no press fit of the core in the cup-shaped portion is necessary so that tolerances corresponding to the different heat expansion characteristics of the two materials can be provided.

Since extraction of the core from the cup-shaped portion without tilting and without damage is extremely difficult with a normal tool, the core is provided with a longitudinal through bore. The inner piston can then be removed from the cup-shaped portion without tilting by compressed air, which is conveniently available in every motor-vehicle workshop, acting uniformly on the lower end face of the core. The longitudinal bore of the core preferably leads into its tapped bore into which the screw for securing the cover is screwed.

Further details, advantages and features of the invention will become apparent from the following detailed description with reference to the accompanying drawings wherein:

FIG. 1 is an elevational view, partially in cross-section, of the sliding caliper of a disc brake according to the invention; and FIG. 2 is an enlarged cross-sectional view of a part of FIG. 1 showing the part in greater detail.

DETAILED DESCRIPTION

Figure 1:
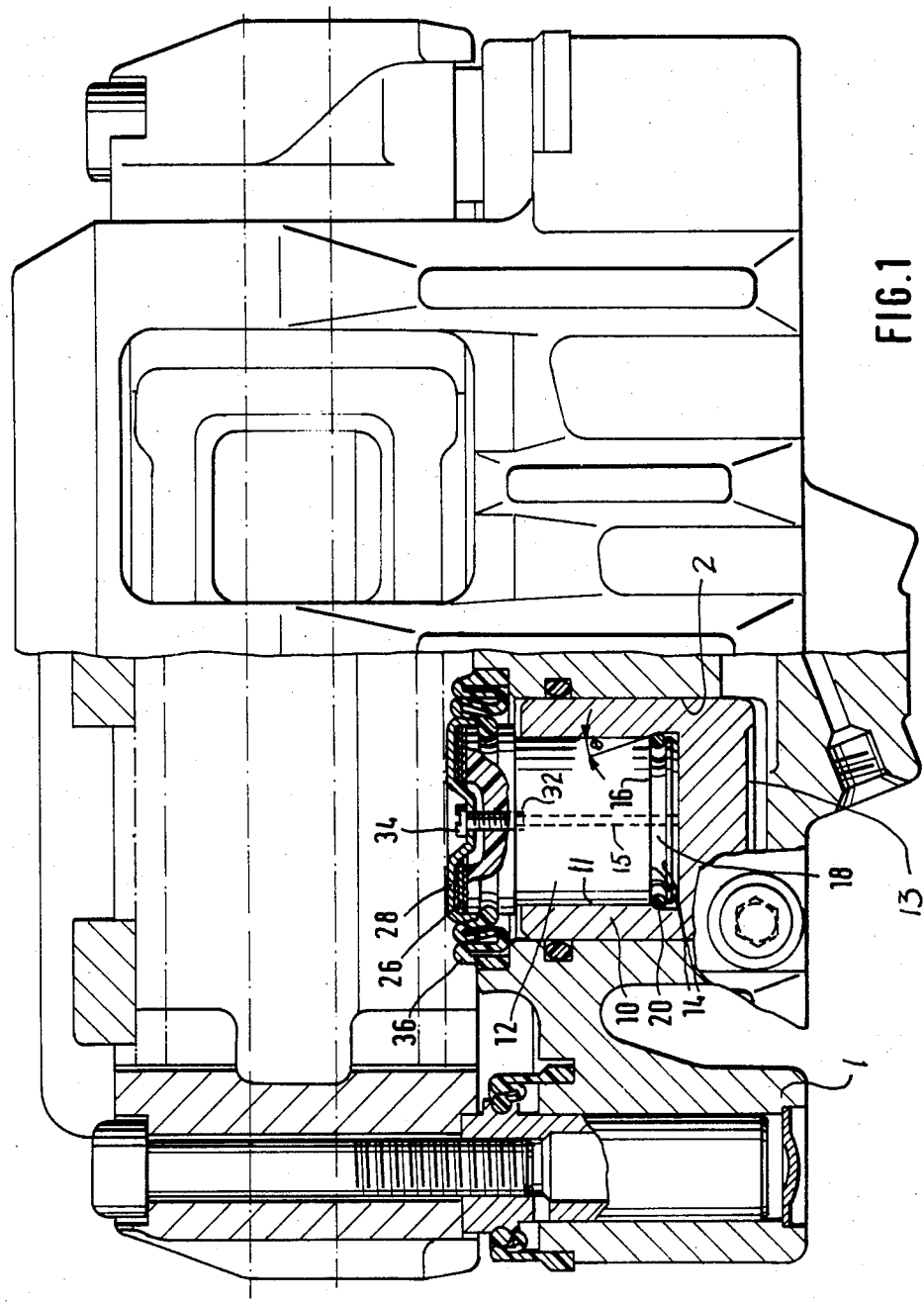

The sliding caliper of a disc brake shown in FIG. 1 is guided for displacement parallel to the axis of a brake disc (not shown) in a brake anchor plate (not shown). In one of the two arms of the caliper engaging over the brake disc there is disposed a hydraulic actuating device which serves to press a brake shoe (not shown) against the brake disc as a result of which, the caliper is displaced in relation to the brake disc under the influence of the reaction force and a brake shoe disposed in its opposite arm is likewise pressed against the brake disc. Such a sliding-caliper disc brake is known in the prior art and its basic design is known to the expert. The present description is therefore limited to the special construction of the piston of the hydraulic actuating device.

The piston of the hydraulic actuating device is mounted in cylinder 2 in housing 1 and is of two-part construction consisting of a cup-shaped member 10 having inner cylindrical core 12 inserted therein. The cup-shaped portion 10, the bottom 13 of which is acted upon by the hydraulic fluid, is made of spheroidal graphite cast iron which is known by the name GGG-60. Cylindrical core 12 is made of a plastics material with a low heat conductivity which is obtainable commercially under the protected marks "Vynkier", "Vyncolite", or "Bakelite". The cylindrical inner face 11 of cup-shaped member 10 is provided near the bottom with a circular recess 14. This recess 14 has an inclined face 16 which is inclined at an angle θ of 20° to the longitudinal axis of member 10 so that the recess diverges towards the bottom of the inner face 11. The cylindrical core 12 is provided, near its lower end, with a circumferential groove 18 in which a circlip 20 is inserted. The depth of the circumferential groove 18 corresponds at least to the cross-section of the circlip 20 so that this can penetrate completely into the circumferential groove 18 for the insertion of the core 12 in the cup-shaped member 10. When core 12 has been inserted completely into member 10, the circlip is in the region of the recess 14 so that it can expand radially outwardly under its inherent resilience until it comes to bear against the inclined face 16 of the recess. The core 12 is therefore retained in the cup-shaped member 10 by the circlip 20.

Figure 2:
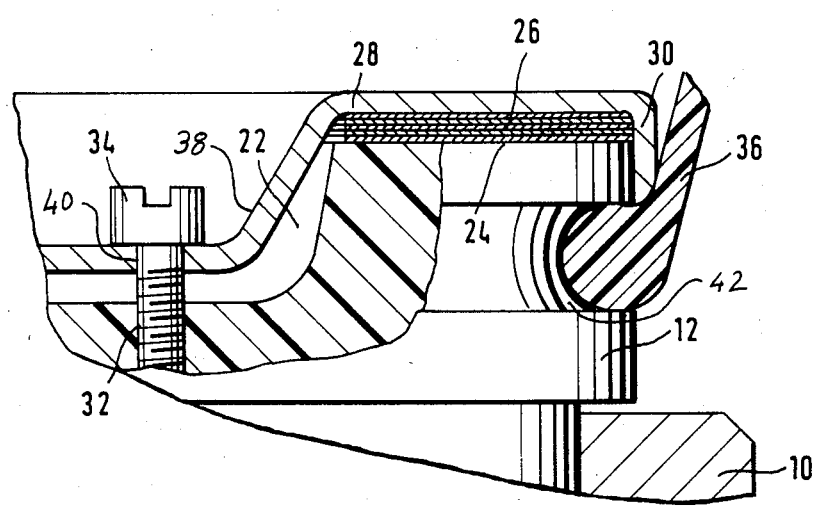

The end face of the core 12 adjacent to the brake shoe is provided with a central recess 22 so that an annular face 24 is formed (FIG. 2). A plurality of thin annular discs 26 of hardened and ground steel, preferably five of them, are disposed on annular face 24 of core 12. On the stack formed by the steel discs 26 there is placed a cover 28 which has a flange 30 engaging over the outer peripheral surfaces of the discs. Cover 28 is provided with a depression 38 which projects into recess 22 in core 12 and which is provided with a central aperture 40. Cylindrical core 12 is provided with a central axial through bore 15 which is constructed in the form of a tapped bore 32 in the upper region thereof. A screw 34 is screwed into tapped bore 32 through aperture 40 in cover 28. The stack formed by the steel discs 26 is therefore braced between cover 28 and annular face 24 of core 12. The flange 30 of cover 28 serves to locate and retain a sealing collar 36 in groove 42 in the periphery of the upper end portion of core 12.

In order to remove the cylindrical core 12 from the cup-shaped member 10, the screw 34 is first unscrewed from the tapped bore 32 and the cover 28 and the steel discs 26 are then removed. Compressed air is then blown in through the tapped bore 32 and the following axial bore 15 in the cylindrical core 12 acting on the under side, or lower outer face, of core 12, whereby the latter is urged axially outwardly of member 10 as a result of which the circlip 20 bearing against the inclined face 16 of the recess 14 in member 10 is urged radially inwardly into the circumferential groove 18 in core 12 so that core 12 is pushed out of member 10 without being tilted.

The internal diameter of the cup-shaped member 10 and the external diameter of the cylindrical core 12 are so dimensioned that they accommodate the different heat expansion characteristics of the two materials.

We claim:

1. An actuator for a hydraulically actuated caliper disc brake having a housing, a brake shoe, a cylinder in the housing, and an actuator mounted in the cylinder and operated by hydraulic fluid pressure for engagement with and operation of the brake shoe comprising:
   a cup-shaped actuating piston slidably mounted in the housing cylinder for displacement toward the brake shoe by the hydraulic fluid;
   an internal cylindrical wall and base in said piston forming a
   hollow interior in said piston;
   a cylindrical core of heat insulating material slidably mounted in said hollow interior and having an outer end face adjacent to the brake shoe, an inner end face adjacent said base and a peripheral surface;
   a longitudinal bore extending completely through said core;
   means for releasably retaining said core in said piston;
   a plurality of annular disc members on said end face of said core for reducing heat transfer from the brake shoe to said actuating piston;
   a removable cover member over said end face and said disc members for retaining said disc members on said end face; and
   removable fastening means extending through said cover member fixedly engageable only with said longitudinal bore in said core through the central openings in said annular disc members for removably retaining said cover member on said core, whereby removal of said fastening means allows access through said bore to the inner end face of said core for pressurizing a space between said end face and base to remove said core from said piston.

2. An actuator as claimed in claim 1 and further comprising:
   a flange on said cover member engaging over the outer peripheral surfaces of said discs.

3. An actuator as claimed in claim 1 wherein:
   said cup-shaped member is comprised of spheroidal graphite cast iron; and
   said core is comprised of plastics material.

4. An actuator as claimed in claim 1 wherein said releasable retaining means comprises:
   a circular recess in said internal cylindrical wall of said piston;
   an inclined face portion on said circular recess diverging towards said base of said hollow interior;

a peripheral groove in the peripheral surface of said core; and a circlip disposed between said inclined face and said peripheral groove for removably retaining said core in said hollow interior.

5. An actuator as claimed in claim 4 wherein:

said hollow interior of said piston has a longitudinal axis; and said inclined face portion has an angle of inclination of 20° relative to said longitudinal axis.

6. An actuator as claimed in claim 5 wherein:

said removable fastening means comprises a central screw means.

7. An actuator as claimed in claim 6 and further comprising:

a flange on said cover member engaging over the outer peripheral surfaces of said discs.

8. An actuator as claimed in Claim 7 wherein:

said cup-shaped member is comprised of spheroidal graphite cast iron; and said core is comprised of plastics material.

9. An actuator as claimed in claim 6 and further comprising:

a central recess in said outer end face of said core, said outer end face being annular; and a depressed central portion on said cover member projecting into said central recess, said removable fastening means extending through said depressed central port ion of said cover member.

10. An actuator as claimed in claim 9 and further comprising:

an internal screw thread in said longitudinal bore at the end thereof adjacent said outer end face of said core, said central screw means threadably engaging in said screw thread.

11. An actuator as claimed in claim 10 and further comprising:

a circular groove in said peripheral surface of said core adjacent said outer end face thereof; and a sealing collar between the housing and said core having an inner portion engaging in sealing relationship in said circular groove.

12. An actuator as claimed in claim 1 wherein:

said removable fastening means comprises a central screw means.

13. An actuator as claimed in claim 12 and further comprising:

an internal screw thread in said longitudinal bore at the end thereof adjacent said outer end face of said core, said central screw means threadably engaging in said screw thread.

14. An actuator as claimed in claim 1 and further comprising:

a central recess in said outer end face of said core, said outer end face being annular; and a depressed central portion on said cover member projecting into said central recess, said removable fastening means extending through said depressed central portion of said cover member.

15. An actuator as claimed in claim 1 and further comprising:

a circular groove in said peripheral surface of said core adjacent said outer end face thereof; and a sealing collar between the housing and said core having an inner portion engaging in sealing relationship in said circular groove.

* * * * *